United States Patent [19]
Peng et al.

[11] Patent Number: 5,935,225
[45] Date of Patent: Aug. 10, 1999

[54] METHOD FOR EXPANDING HOT KEYS ON A KEYBOARD

[75] Inventors: Steve Peng, Taipei; Chunn-Cherh Kuo, Taipei Hsien, both of Taiwan

[73] Assignee: Silitek Corporation, Taipei, Taiwan

[21] Appl. No.: 08/713,515

[22] Filed: Sep. 13, 1996

[51] Int. Cl.$^6$ .................................................. G06F 13/00
[52] U.S. Cl. ............................................. 710/67; 708/146
[58] Field of Search ................................. 341/22, 23, 26; 710/67, 72, 73; 708/146

[56] References Cited

U.S. PATENT DOCUMENTS

| | | | |
|---|---|---|---|
| 4,567,567 | 1/1986 | Lapeyre | 364/709.16 |
| 4,964,075 | 10/1990 | Shaver et al. | 395/887 |
| 5,056,057 | 10/1991 | Johnson et al. | 395/893 |
| 5,087,910 | 2/1992 | Guyot-Sionnest | 345/169 |
| 5,287,526 | 2/1994 | Wolf et al. | 364/709.16 |
| 5,333,273 | 7/1994 | Raasch et al. | 395/887 |
| 5,360,343 | 11/1994 | Tang | 400/110 |
| 5,387,042 | 2/1995 | Brown | 400/477 |

*Primary Examiner*—Ayaz R. Sheikh
*Assistant Examiner*—Xuong Chung-Trans
*Attorney, Agent, or Firm*—Smith, Gambrell & Russell, LLP; Beveridge, DeGrandi, Weilacher & Young Intellectual Property Group

[57] ABSTRACT

A method for expanding hot keys on a keyboard is provided wherein the standard key codes for alphabets A–Z, numbers 1–0, functional keys F1–F12, can be combined with E0 code of special key of the IBM keyboard, accordingly, a new expanding codes are established, These so defined extendible codes are supported by the application program of the Windows to increase the utilization of the hot keys. These extendible codes are completely compatible with IBM PC. Besides, interference resulted from expanding the utilization scope of the standard codes of the operating system can be avoided.

2 Claims, 2 Drawing Sheets

METHOD FOR EXPANDING HOT KEYS ON A KEYBOARD

FIELD OF THE INVENTION

The present invention relates to a method for expanding hot keys on a keyboard wherein the standard key codes for letters A–Z, numbers 1–0, and functional keys F1–F12, can be combined with the E0 code of the special keys of the IBM keyboard. Accordingly, new expanding codes are established. On the other hand, these hot keys can be supported by the application program of the Windows operating system. Consequently, the utilization of the keyboard is increased.

A standard keyboard, which is widely accepted and normally referred to as an IBM keyboard, generally incorporates one hundred and eight (108) key codes for designating a key. Nevertheless, when special keys for a designated language and system command are subtracted, there only eight (8) keys still available. Accordingly, the utilization of the hot keys is limited.

An attempt has been made to define the extendible code for special function keys, i.e. Insert, Home, Page-up, Page-Down, . . . , etc . . . ). In practice, an "E0" code for a special key is combined with a standard code to form an extendible code.

In the above described method, the hot key can be readily added without utilization of the rarely left code. Nevertheless, there are only few special keys which have been defined on an IBM keyboard. In light of this, it is unacceptable for the existing computer system to have additional hot keys in a standard keyboard no matter whether it takes key code or extendible code.

SUMMARY OF THE INVENTION

It is the object of this invention to provide a method for expanding hot keys on a keyboard wherein the extendible codes of the IBM keyboard can be readily extended while these hot keys are supported by the application program of the Windows operating system. By this arrangement, the utilization of the keyboard is increased.

In order to achieve the object set forth, the method is disclosed for expanding hot keys on a keyboard wherein the standard key codes for letters A–Z, numbers 1–0, and functional keys F1–F12, are combined with the E0 code of special keys of the IBM keyboard to define extendible codes. Said hot keys are supported by the application program of the Windows operating system. Accordingly, the utilization of the keyboard is increased. On the other hand, the keyboard with additional hot keys is completely compatible with the IBM PC or the like. Besides, interference resulting from expanding the utilization scope of the standard codes of the operating system can be avoided.

BRIEF DESCRIPTION OF THE DRAWINGS

These and other objects, of the invention will become more apparent in conjunction with the following description and drawings which are explanatory and not for limitation, wherein.

DETAILED DESCRIPTION OF THE PREFERRED EMBODIMENT

Figure 1:
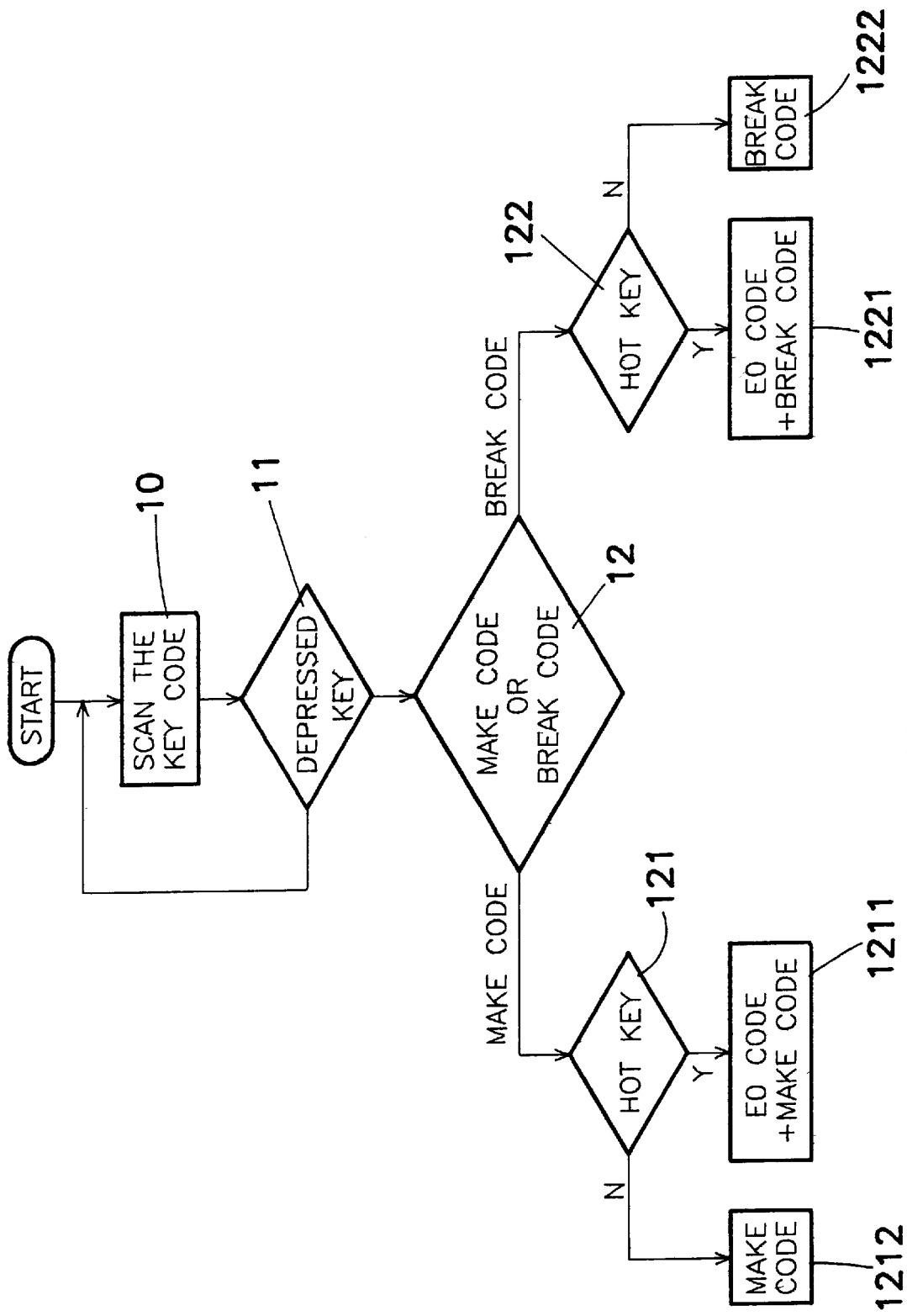
FIG. 1 is a flow chart showing the procedure of generating the extendible codes of the keyboard.

Referring to FIG. 1, a method for expanding hot keys on a keyboard wherein the standard key codes for letters A–Z, numbers 1–0, functional keys F1–F12, can be combined with the E0 code of special keys of the IBM keyboard. Accordingly, new expanding codes are established. The generating procedures are shown as follow.

After the stand-by status of the operating system of the keyboard, it will scan the key codes 10 to determine whether there is a depressed key 11.

If there isn't a depressed standard key, it will resume the stand-by status and scan the key codes 10 continuously. If a depressed key is detected, then a make code or break code 12 will by transmitted.

If a make code is sent, then it will determine whether a hot key 121 has been depressed. If indeed a hot key is depressed, then E0 code+make code 1211 will be sent; if there isn't a hot key being depressed, then a make code 1212 will be sent.

If a break code is sent, then it will determine whether a hot key 122 is depressed. If indeed a hot key is depressed, then E0 code+break code 1221 will be sent. If there isn't a hot key being depressed, then a break code 1222 will be sent.

By this arrangement, the key code of the keyboard can be used with the E0 code to define an extendible code.

Figure 2:
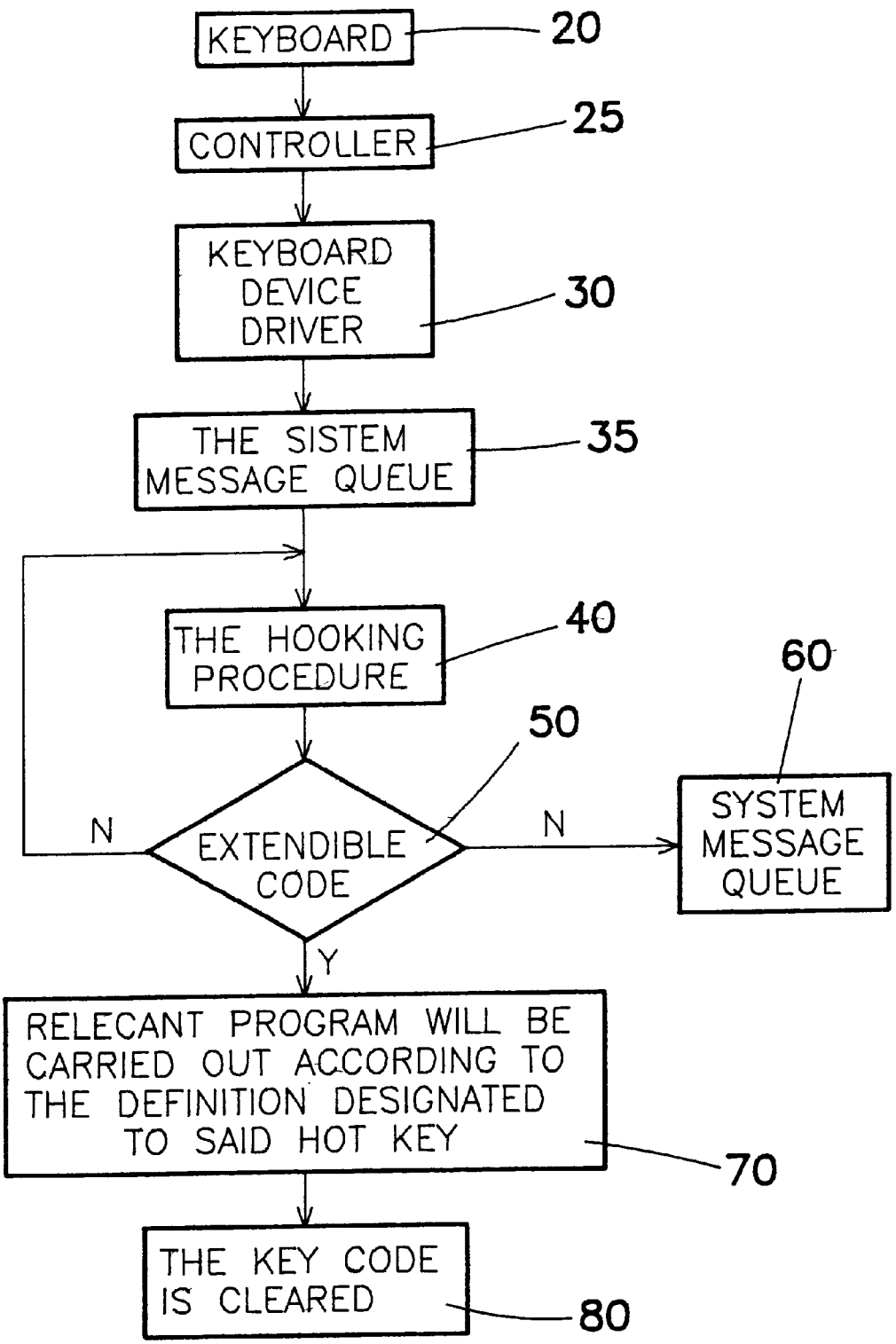
FIG. 2 is a flow chart showing the processing procedure of the application program of the Windows operating system.

Referring to FIG. 2, the processing procedure for the application program of the Windows operating system in processing an extendible code is shown.

The controller 25 disposed within the computer will receive the key code sent from the keyboard 20 and transfer this received code into another code.

The keyboard device driver 30 will hook the key code from the keyboard controller 25 and send it to the system message queue 35.

Afterward, the system message queue 35 will send out the system message, including said key codes, in order.

Then the system message queue 35 will be received by the hooking procedure 40 to determine whether there is extendible code 50.

If an extendible code is determined, then relevant program 70 will be carried out according to the definition designated to said hot key. When the program is carried out, then the key code 80 is cleared. If no extendible code is determined, then the system message queue will be sent to the next hooking procedure 40 or this system message queue 60 will be released for system use.

By the above described procedures, the hot keys can be readily extended by the help of the extendible code of IBM and the application program of the Windows operating system.

A preferable embodiment will be described.

When the "A" key on the standard keyboard is depressed, according to FIG. 1, a make code or break code will be sent wherein the inter code of the make code is designated to 22 and the break code is designated to A2.

Afterward, when a hot key is depressed, for example PLAY, then the keyboard will send out E0+22 and E0+A2.

Then the keyboard controller 25 will receive these signals and transfer them into other internal codes. These internal codes will be sent to system message queue 35 via driver 30. The hooking procedure 40 will receive the corresponding codes, i.e. make code "011E" or break code "011E".

In the same time, the program will determine whether this code is an extendible code and carry out a pertinent program operation according to the special function designated to "PLAY". If it is not an extendible code, then it will release this code or send this code to the next procedure for further processing.

By the above description, the present invention is completely compatible with the IBM PC and defines extendible codes. On the other hand, it is also supported by the application program of the Windows operating system. Consequently, the utilization of the hot key is extended.

While one particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of the present invention.

We claim:

1. A method for employing hot keys on a keyboard, comprising:

combining a standard key code of a keyboard with an E0 code to define at least one extended code corresponding to an operation in a software application;

transmitting the at least one extended code to a keyboard controller and subsequently translating the at least one transmitted extended code into a make code corresponding to the at least one extended code;

transmitting the make code to a system message queue;

for each make code in the system message queue, determining whether said make code corresponds to the at least one extended code; and when a make code in the system queue is determined to correspond to the at least one extended code, performing the operation in the software application corresponding to the at least one extended code.

2. A method for expanding hot keys on a keyboard as recited in claim 1, wherein said standard key is selected from standard key codes corresponding to letters A–Z, numbers 1–0, functional keys F1–F12, and other symbolic keys, "", and "\".

\* \* \* \* \*